United States Patent [19]

Chauvel

[11] Patent Number: 4,791,476
[45] Date of Patent: Dec. 13, 1988

[54] DEVICE FOR THE COMPOSITION OF COLOR COMPONENT SIGNALS FROM LUMINANCE AND CHROMINANCE SIGNALS AND VIDEO DISPLAY DEVICE COMPRISING THE APPLICATION THEREOF

[75] Inventor: Gerard Chauvel, Cagnes, France

[73] Assignee: Texas Instruments Incorporated, Dallas, Tex.

[21] Appl. No.: 887,583

[22] Filed: Jul. 18, 1986

[51] Int. Cl.⁴ .............................................. H04N 11/06
[52] U.S. Cl. ........................................ 358/13; 358/22; 358/80
[58] Field of Search ....................... 358/11, 12, 13, 30, 358/28, 27, 64, 22, 25, 80, 244, 81; 340/704, 720, 703; 354/76

[56] References Cited

U.S. PATENT DOCUMENTS

| 4,232,311 | 11/1980 | Agneta | 358/81 X |
| 4,533,952 | 8/1985 | Norman, III | 358/22 X |
| 4,544,945 | 10/1985 | Lewis, Jr. et al. | 358/13 X |
| 4,549,201 | 10/1985 | Tanaka et al. | 358/13 |
| 4,597,006 | 6/1986 | Orsburn | 358/22 |
| 4,660,070 | 4/1987 | Nishi | 358/11 |

Primary Examiner—Howard W. Britton
Assistant Examiner—Victor R. Kostak
Attorney, Agent, or Firm—Douglas A. Sorensen; Thomas W. DeMond; Melvin Sharp

[57] ABSTRACT

A color signal is encoded into luminance and chrominance signals. Relationships between the luminance and chrominance signals, and the color components are computed. A color component signal is generated by matrixing these relationships. In addition, a signal processor may be used to combine other video images with the color component signal.

9 Claims, 6 Drawing Sheets

Fig. 3

DEVICE FOR THE COMPOSITION OF COLOR COMPONENT SIGNALS FROM LUMINANCE AND CHROMINANCE SIGNALS AND VIDEO DISPLAY DEVICE COMPRISING THE APPLICATION THEREOF

BACKGROUND AND SUMMARY OF THE INVENTION

The present invention relates to display devices for a television screen and more particularly relates to video image display devices on a line-by-line and dot-by-dot scanning screen of use in particular for displaying images in computer industry systems.

In FR No. 84-10374 filed on June 29, 1984 in the name of the Applicant, there is disclosed a display device in which the image is formed on the screen with the following elements:

a page memory which contains the television description of the image to be displayed;

an address processor which computes the addresses of access to the page memory as a function of the signals it receives from a time base;

a display processor which contains all the elements for controlling the scanning and the red R, green G, blue B inputs of a television set or monitor; the data of the page memory are transferred in the display processor so as to generate R.G.B. signals at the scanning rate issuing from the time base;

a central processing unit associated with an interface circuit which permits the loading of the contents of the page memory for subsequent display.

Display processes are moreover known which will be briefly described hereinafter.

For the organization of the display, the address processor uses at the minimum two basic address BAZA and display zone PZA pointers in the registers of the address processor. During the signal of the beginning of the raster issuing from the time base, the signal of the beginning of the page memory to be displayed BAZA is transferred in PZA.

During the active zone of the screen, each Req. visual signal issuing from the time base is transmitted to a dynamic access control device DMA associated with the address register and which generates a visualization cycle for extracting the characteristics of the following dots in the page memory.

If four planes are selected in the register of the display processor, the DMA device produces four CAS signals which permit the extraction of four words from the page memory for each Req. visu demand.

The four words are transferred to four plane registers which await the loading thereof in shifter registers associated with the display monitor.

By way of example, each word is composed of 16 bits. Four words therefore permit the choice of a colour among sixteen for the following dots.

At the scanning rate of the television receiver, at each dot clock signal, the shifter registers associated with the monitor select an address of a palette memory which contains the colour correspondence between the information contained in the planes of the page memory and the R.G.B. outputs through analog-digital converters interposed between the palette memory and the display monitor.

This display technique is well adapted to the graphic mode which requires a sudden change in the colour for each point of the screen.

For example, if it is required to display a red rectangle on a green background, at the periphery of the rectangle, it is necessary to suddenly change from a maximum level on the green output G to a maximum level on the red output R.

If the palette memory comprises five bits for each R.G.B. component, each one thereof will be able to have $2^5 = 32$ distinct levels.

By selecting the different levels on each output, it is possible to obtain $32^3$, namely 32768 different colours. However, if the number of planes is limited to six for example, the palette memory will only contain $2^6 = 64$ colours which are selected from the aforementioned 32768 colours.

The choice of the 64 colours is ensured by the loading of the palette memory under the control of the central processing unit.

In most of the graphic applications, the restoring will not require more than sixty-four colours.

On the other hand, for restoring photographic images, for example of countrysides or portraits, this number is much too limited.

In order to correctly restore an image of the aforementioned type, it is possible to:

increase the number of planes;

use a compression technique.

Experience has shown that without a compression technique, a minimum of fifteen planes are required for correctly restoring most photographic images.

On the other hand, by using a differential pulse code modulation DPCM, the same image quality may be restored according to the photo type with 4, 5 or 6 bits.

The DPCM technique employs the following characteristics:

In a photographic image, if the difference of level of each R.G.B. component of a dot of the image to the following dot is analyzed, it is found that 75% of the spacings between dots are less than 1/256, assuming that there are 256 levels of luminance on each component.

50% of the spacings are less than 2/256.

5% of the spacings are less than 10/256.

The DPCM technique consists in loading in the page memory the spacings relating to a component.

In order to decrease the memory size of a photographic image, it is preferable to encode it as differences of luminance and chrominance.

However, two problems arise.

The images of graphic type are generally coded in a graphic mode and most television sets accept items of information coded in R.G.B.

An object of the invention is to provide a device which permits the conversion of the luminance and chrominance coded pictures into R.G.B. levels so as to be in a position to display indifferently images in the graphic and photographic mode in the same image on a television set having R.G.B. inputs.

The invention therefore provides a device for the compositionn of signals from luminance and chrominance signals, comprising means for computing the relations relating the luminance and the chrominance with colour components, wherein said computing means are logic means comprising luminance and chrominance signal decoding means and means for matrixing said decoded luminance and chrominance signals according to relations established between the luminance and the chrominance on one hand, and the colour components on the other hand.

The invention also provides a device for the composition of the type defined hereinbefore, wherein said matrixing means comprises as many matrixing circuits as there are colour components to be obtained and are each constituted by at least one adder adapted to restore the corresponding colour component by effecting the relation relating said colour component with the luminance and chrominance values obtained at the output of the decoder.

BRIEF DESCRIPTION OF THE DRAWINGS

A better understanding of the invention will be had from the following description which is given solely by way of example with reference to the accompanying drawings, in which:

FIG. 3 is a more detailed partial diagram of the device of FIG. 1, to which the invention is applied;

DESCRIPTION OF THE PREFERRED EMBODIMENT

Figure 1:
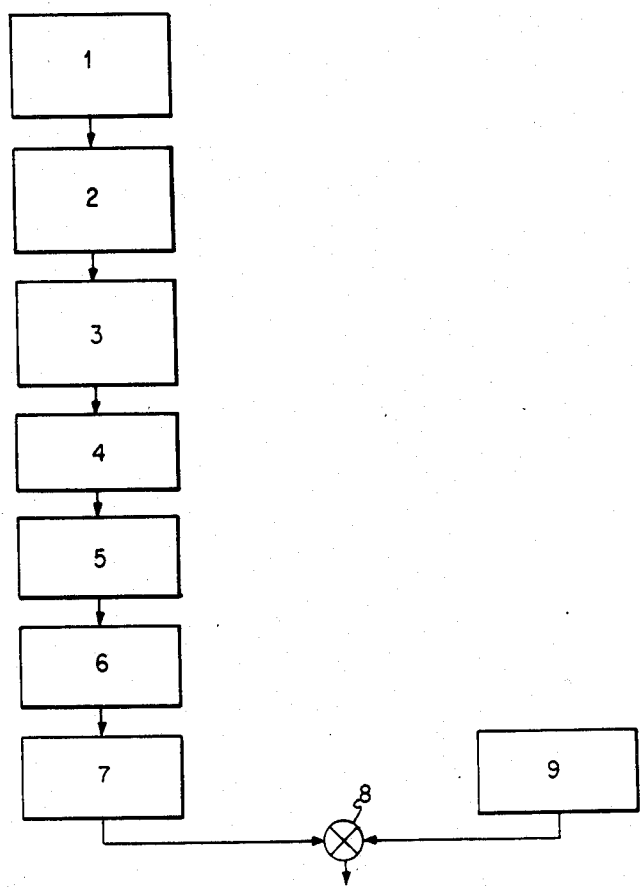
FIG. 1 is a diagram of a procedure for converting items of information and display to which the invention is applied.

The diagram of FIG. 1 illustrates the procedure for converting items of information to which the invention is applied for the purpose of achieving the desired display.

This procedure comprises storing in memory at 1 the data relating to an RGB coded reference photographic image.

This reference image is for example encoded on eight bits by R, G and B components, namely on in all twenty four bits.

Then, the R, G, B signals are encoded at 2 into luminance signals Y and chrominance signals DR and DB.

The reference image is RGB coded with eight resolution bits per R, G, B component, namely 256 levels.

From this reference image, there are computed the luminance and the chrominance of each dot of the image by means of the following theoretical equations:

$$Y = 0.299R + 0.587G + 0.114B$$

$$DR = R - Y$$

$$DB = B - Y$$

At 3, there is effected an encoding by differential pulse code modulation (DPCM).

Figure 6:
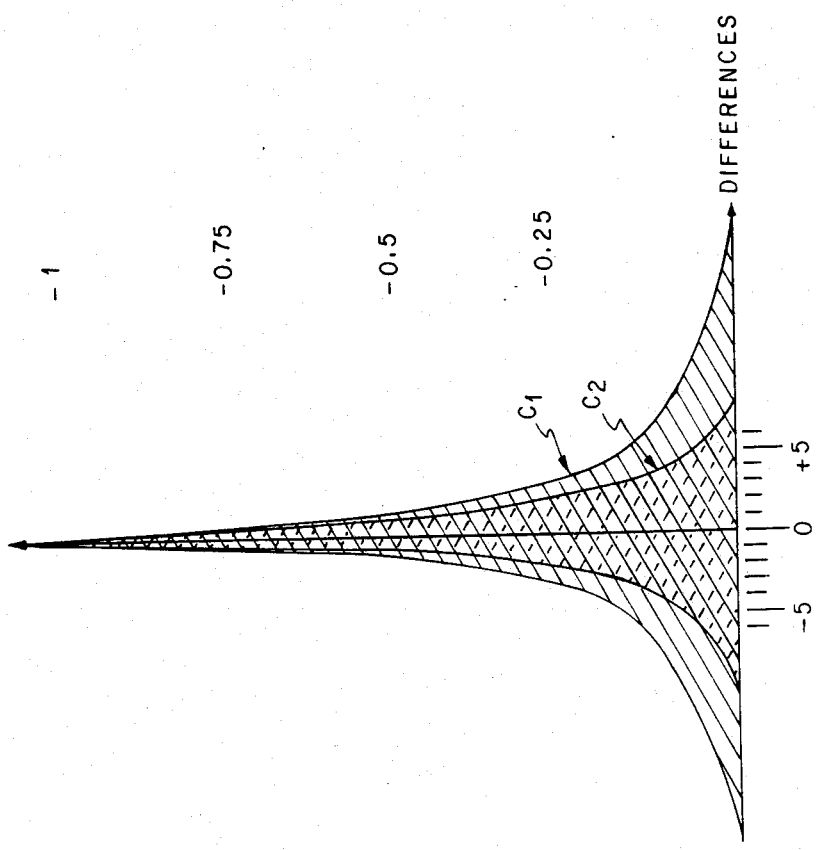
FIG. 6 is a graph showing one histogram example of the differences of luminance and chrominance between neighbouring dots of an image.

An analysis of the distribution of the differences between two values close to Y, DR and DB, and a plotting of a histogram of the type shown in FIG. 6 permit proceeding to a selection of quantization values.

The histogram of FIG. 6 represents a curve $C_1$ showing the distribution of the differences of luminance between two neighbouring dots and a curve $C_2$ showing the differences of chrominance which are preferably identical for DR and DB.

Each image has its own histogram.

However, the quantization values are generally very close from one image to another.

There is then effected at 4 the choice of the quantization values and the changing of the planes $\Delta Y$, $\Delta DR$ and $\Delta DB$ in the page memory.

For example, the following quantization values may be selected:

| −64 | −16 | −4  | −1  | +1  | +4  | +16 | +64 |
|-----|-----|-----|-----|-----|-----|-----|-----|
| (0) | (1) | (2) | (3) | (4) | (5) | (6) | (7) |

With the chosen quantization values, it is attempted to follow the theoretical variation of Y, DR and DB as closely as possible.

Figure 7:
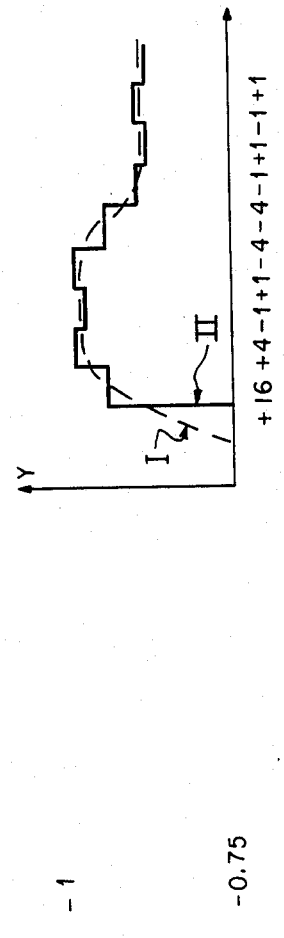
FIG. 7 is a curve representing the variation of the luminance during the scanning of a line.

As shown in FIG. 7, the curve I is an example of a variation in luminance during the scanning of a line.

Eight quantization values from 0 to Y are put into the quantization value table. There are employed values such that the plotting of the curve II follows as closely as possible the theoretical curve I.

The planes Y of the page memory are loaded with the codes corresponding to these values.

For example:

(6) 1 1 0 for +16

(5) 1 0 1 for +4

(3) 0 1 1 for −1

Therefore, three planes are sufficient to encode the value Y in the page memory and to obtain it at the output of the DPCM decoder.

Of course, the chosen number of quantization values represents the quality of the image.

The same principle is employed for restoring DR and DB.

After the loading at 5 of the planes $\Delta Y$, $\Delta DR$ and $\Delta DB$ into the page memory, the DPCM decoding is effected at 6 in the course of which the loading of the quantization values and the restoration of Y, DR and DB are achieved.

Then, there is effected at 7, according to the invention, the matrixing of the signals Y, DR and DB into R, G, B signals, and, after an appropriate processing at 8, there is effected the display at 9 of the R, G, B image on a screen.

The encoding of the reference photographic image signals into luminance and chrominance signal Y, DR and DB and the RGB matrixing will be described hereinafter.

There will also be described hereinafter the processing of the signals resulting from the matrixing operation.

The matrixing of the luminance and chrominance signals into RGB signals was heretofore achieved by using operational amplifiers.

Now, in integrated LSI circuits having an extreme integration, it is very difficult to mix the digital techniques with analog sub-assemblies.

The matrixing device according to the invention is fully digital and can therefore be applied to the integrated LSI circuits.

Figure 2:
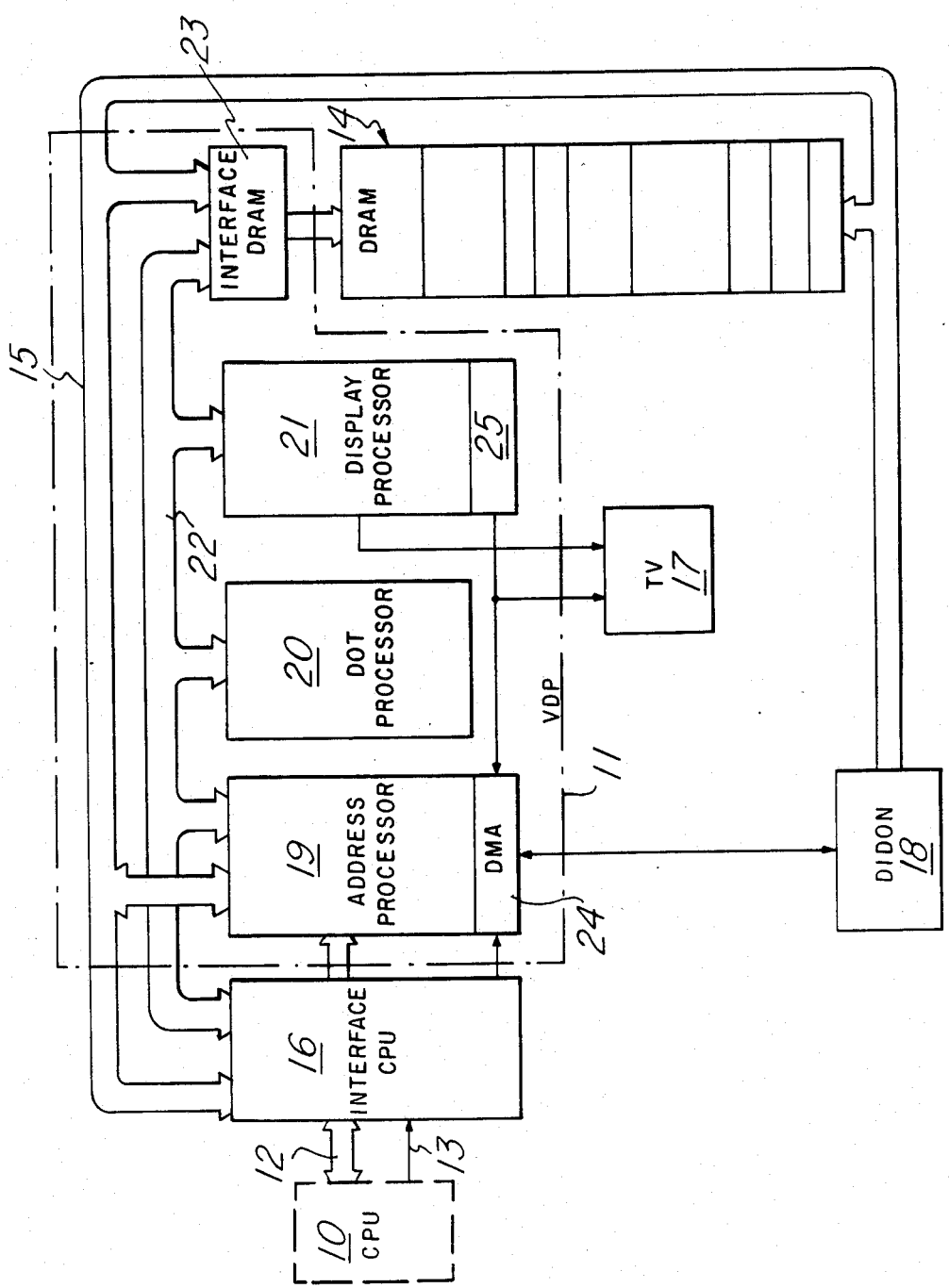
FIG. 2 is a block diagram of a known display device.

The display shown in FIG. 2 comprises:

a central processing unit 10, termed hereinafter CPU, which is adapted to manage all the operations of the system by means of a program contained in its own memory;

a video display processor 11, termed hereinafter VDP, communicating with the CPU 10, through a bus 12 and a control line 13, the circulation of the data on the bus 12 being ensured in time multiplexing for addresses and data in accordance with the procedure disclosed in particular in FR-83 03142 filed on Feb. 25, 1983 in the name of the Applicant;

a dynamic general memory 14, termed hereinafter DRAM, which can communicate with the other elements of the system through a time division bus 15, the latter being connected in particular to the CPU 10 through an interface 16;

a display unit 17 which may be a conventional television set or an equally conventional monitor, this element being adapted to display visual information produced in the system;

an external unit 18 or Didon by means of which the system of FIG. 2 can communicate with an external source of information, for example a teletext transmitter connected to the system through a broadcast television channel or through a telephone line; the external unit 18 may load the information into the memory 14 to permit, after processing in the system, their display on the screen of the display unit 17.

The video display processor 11 comprises an address processor 19, a point processor 20 adapted to effect the processing of the dots or "pixels" of the screen of the unit 17, for example for obtaining a change in shapes in the image and a display processor 21, these elements communicating with each other through the time division bus 15 and a bus 22 on which solely data may circulate.

The buses 15 and 22 are connected to the DRAM memory 14 through an interface 23 permitting the multiplexing od the data and addresses intended for the DRAM 14.

Also provided is a control device 24 of dynamic access to the DRAM memory 14. This device, hereinafter termed DMA, has been disclosed in detail in FR-A-2 406 250 and in the French patent application No. 83 03143 filed on Feb. 24, 1983 both in the name of the Applicant.

A time base circuit 25 is associated with the display processor 21 and in particular communicates with the DMA circuit 24, the monitor 17 and the display processor 21 itself.

There will now be described with reference to FIG. 3 the part of the device of FIG. 2 to which the invention is applied.

Figure 3:
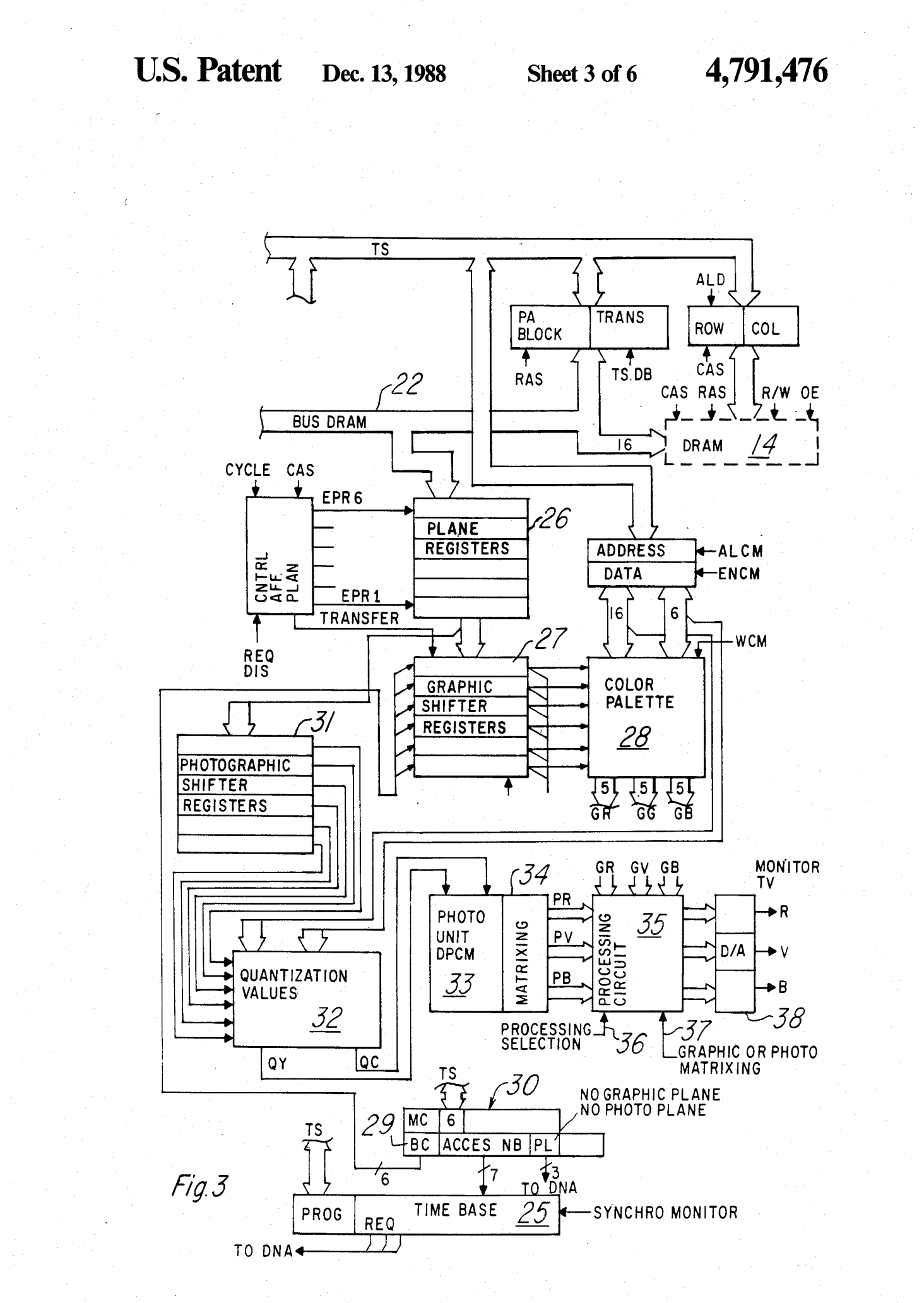

FIG. 3 essentially represents the elements of the device which are part of the display processor 21 of the device of FIG. 2.

The DRAM memory 14 is connected through the bus 22 to a group of plane registers 26 which may be loaded by the dot processor 20 (FIG. 2) or the DRAM memory 14.

The plane registers 26 are connected to shift registers 27 in the graphic mode whose outputs are connected to a RAM memory 28 or colour palette memory.

The clock inputs of the registers 27 are connected to the time base 25. Normally, the shifting frequency is equal to the frequency at which the dots are displayed on the screen.

The shifter registers 27 may be loaded by the group of plane registers 26 and by a register 29, termed "base colour register" which is part of an attribute storing unit 30. The unit 30 may be loaded by the bus 15, for example from the memory 14 or the CPU 10.

In order to permit controlling a display in graphic mode and/or photographic mode, the circuit of FIG. 3 further comprises, according to the invention, a series of shifter registers 31 in photographic mode whose inputs are connected to the plane registers 26 and whose outputs are connected to a first series of inputs of a circuit 32 producing quantization values. A second series of inputs of the circuit 32 is connected to the address and data inputs of the colour palette memory 28.

The circuit 32 producing quantization values is connected to a photographic unit 33 which is associated a matrixing device 34, the two latter circuits being part of the construction of the device converting the luminance and chrominance signals into R, G, B signals which will be described with reference to FIG. 4.

The outputs of the matrixing circuit are connected to a circuit 35 processing R, G, B signals of graphic and/or photographic origin which will be described in detail with reference to FIG. 5.

The circuit 35 is moreover connected by corresponding inputs GR, GG, GB to the outputs GR, GG, GB of the colour palette memory 28.

It receives on two control inputs 36, 37 process selection signals and graphic or photographic multiplexing signals.

The outputs of the processing circuit 35 are connected to the corresponding inputs of digital-analog converters 38, which are connected to the R, G, B terminals of the monitor 17 (FIG. 2).

The device for converting luminance and chrominance signals into R, G, B signals will now be described with reference to FIG. 4.

This device, which includes the photographic unit 33, the matrixing circuit 34, the processing circuit 35 and the digital-analog converters 38, comprises:

DPCM decoders 40, 41, 42;
R, G, B matrixing devices 43, 44, 45, 46;
the processing device 35 (FIG. 3);
the digital-analog converters 38, and
a control logic 47.

For each of the channels Y, DR and DB, the corresponding DPCM decoder comprises an adder 48, 49, 50 whose outputs are connected to a register 51, 52, 53 which stores in memory at each clock signal CPR, CPB, the result of the operation between the value it contains before the clock signal with the quantization value QC or QY delivered by the quantization memory.

Figure 8:
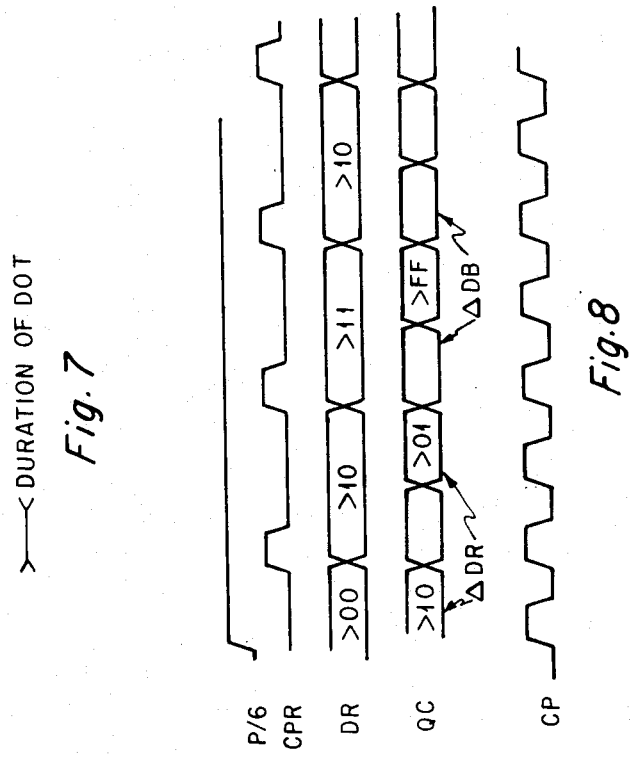
FIG. 8 shows the signals at particular points of the circuit of FIG. 4.

As the graph of FIG. 8 shows, the P/G signal which indicates the start of a photographic processing releases the clock signal generator CPR.

During the low period of the P/G signal, the register 51 is forced to zero by the gate 54.

In the beginning, DR is equal to zero. The samples ΔDR are presented to the input of the adder before each clock signal CPR.

After the first cycle $>00+>10=>10$ ($>$hexadecimal), $>10$ being the quantization value selected from the value table 32 (FIG. 3) by the output of the registers 31.

At the second cycle $Qc=>01$ $DR=>11$ after addition. The following value $>FF$ corresponds to $-1>11+>FF=>10$ in the register DR.

Figure 4:
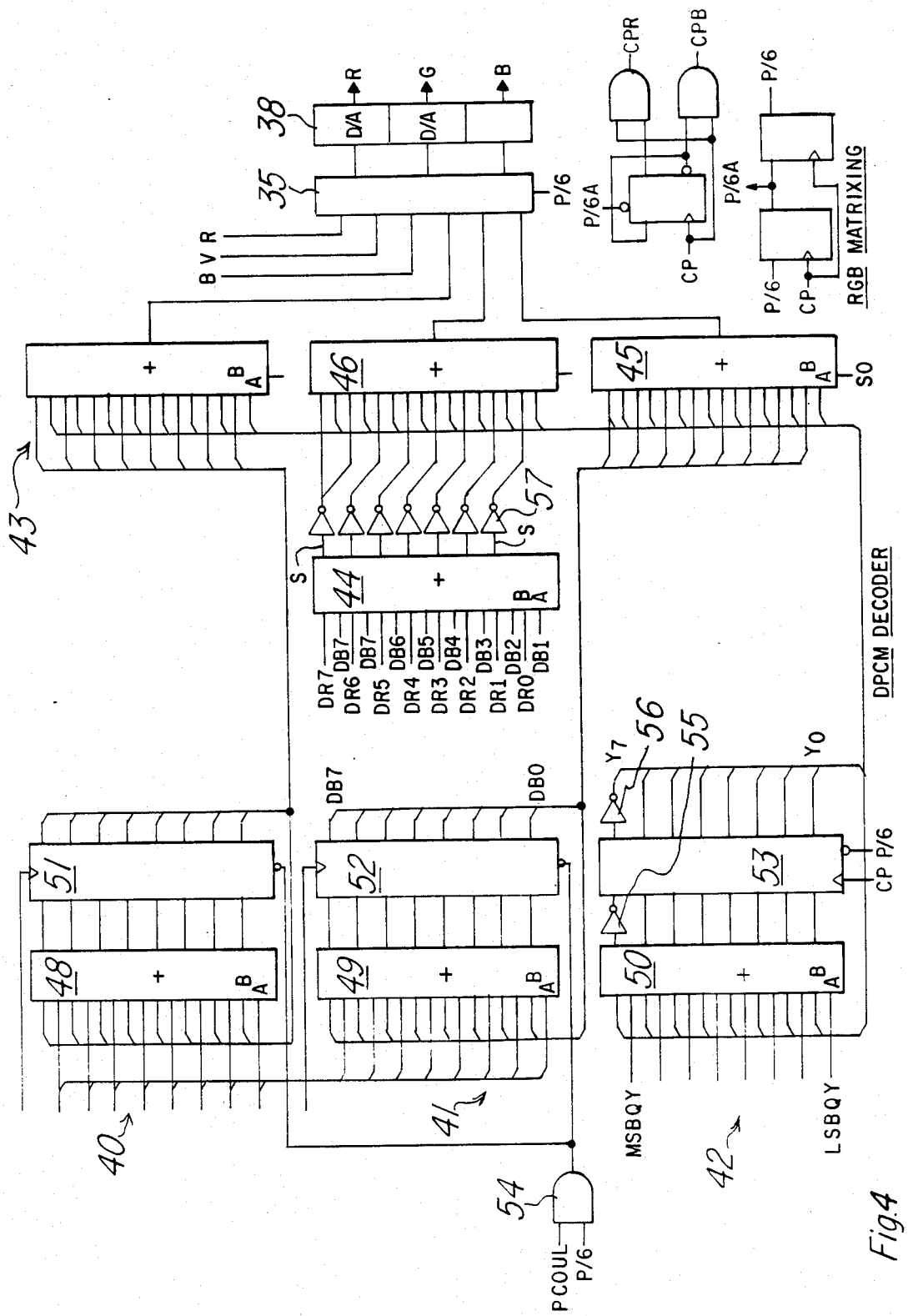
FIG. 4 is a detail diagram of the device for converting luminance and chrominance signals into R.G.B. signals according to the invention.

The operation of the part of the circuit of FIG. 4 with respect to DB is identical with a shift point period and by using the samples ΔDB shown in FIG. 8.

The DPCM decoder 42 of the channel Y uses the same principle, except that the operation is carried out for each clock cycle CP.

There must therefore be a quantization value QY at each point.

Further, at the input and output of the register 53 of the decoder 42 are disposed inverting switches 55, 56 which permits commencing the accumulation procedure during the scanning of each line of the image with a mean luminance value $Y = > 80$.

The R, G, B matrixing circuit is composed for four adders 43, 44, 45, 46.

The adder 43 restores the Red component by effecting the operation:

$Y + DR = R$ according to the previously-given theoretical formula.

The adder 45 restores the Blue component by effecting the operation:

$Y + DB = B$

As concerns the Green channel, the operation is more complicated as indicated by the theoretical formula. There is taken indeed from this formula:

$$V = Y - (0.509DR + 0.194DB) \quad (1)$$

The first adder 44 finds the sum of DR and DB in the following manner:

| | DRY | DR6 | DR5 | DR4 | DR3 | DR2 | DR1 | DR0 |
|---|---|---|---|---|---|---|---|---|
| + | DB7 | DB7 | DB6 | DB5 | DB4 | DB3 | DB2 | DB1 |
| | S7 | S6 | S5 | S4 | S3 | S2 | S1 | S0 |

The eight bits defining DR are added with the bits of DB shifted one position toward the right, which amounts to adding:

$S = DR + DB/2$

Interposed between the adders 44 and 46 are inverters 57. The inverted output S of the adder 44 give the complement at "1", $\overline{S}$, of the result. The adder 46 effects the following operation:

| | Y7 | Y6 | Y5 | Y4 | Y3 | Y2 | Y1 | Y0 |
|---|---|---|---|---|---|---|---|---|
| + | S7 | S7 | S6 | S5 | S4 | S3 | S2 | S1 |
| + | | | | | | | | 1 |
| | V7 | V6 | V5 | V4 | V3 | V2 | V1 | V0 |

The complemented outputs S to which 1 has been added by the carry input $C_n$ of the adder 46, are also shifted one position to the right and added with Y7 to Y0, which amounts to effecting the operation:

$V = Y + (\overline{S} + 1)/2$ namely $V = Y - S/2$ or $V = Y - (DR + DB/2)/2$

The real equation of V is:

$$V = Y - (0.5DR + 0.25\ DB) \quad (2)$$

There is therefore a difference between the theoretical formula (1) and the calculated formula (2) of the Green component obtained by the matrixing circuit.

To correct this difference in such manner that it is not visible in the restoring of the image on the screen, the following equations will be used:

$$Y = 0.2BR + 0.57G + 0.15B \quad (b)$$

$DR = R - Y$ $DB = B - Y$

In these formulae, it can be seen that the luminance value Y has been experimentally adapted to obtain the following restored value of F.

$$G = Y - (0.49R + 0.26B) \quad (3)$$

By comparing the theoretical formula (a) of the luminance $Y = 0.2999R + 0.587G + 0.114B$ with the above formula (b), the formulae (a) and (b) show that the errors in the luminance created by the coefficients of the Rd and Blue components are negligible as concerns the visual perception.

On the other hand, the factor of using the formula (a) enables the chrominance to be correctly restored.

It can be seen that the formula (3) is very close to the formula (2), and this limits to a minimum the differences of luminance and chrominance related with this restoring technique.

Tests have shown that these differences are not visible by the eye relative to the reference image.

The use of formula (b) which corresponds to the RBG matrixing technique, permits the calculation of the quantization values and the content of the planes ΔY0, ΔY1, ΔY2 ΔDR0/ΔDB0, ΔDR1/ΔDB1 and ΔDR2/ΔDB2 which will permit decompressing in real time the values of Y, DR and DB. These values applied in the manner described to the matrixing system enables a correct image quality to be restored.

The conversion device described with reference to FIG. 4 comprises a gate 54 which has an input PCOUL. A signal applied to this input forces the registers 51 to 52 to zero when it is itself at zero level.

The DR and DB components are at zero, which gives for the RGB outputs:

$R = Y + DR \rightarrow R = Y$ $B = Y + DB \rightarrow B = Y$ $G = Y - (0.5DR + 0.25DB) \rightarrow V = Y$ The chrominance is cancelled out and all the outputs are equal to Y so that the image has a grey shade.

The adders 43, 46, 45 each have an input S0. The signal S0 applied to these adders permits a selection of the input B on the outputs of the adders.

The RGB outputs are then equal to:

Output $= B + A$ $R = DR + Y \rightarrow R = DR$ $B = DR + Y \rightarrow B = DB$ $G = Y - (0.5DR + 0.25DB) \rightarrow G = Y$ There is then found RGB:

either an RGB coded colour image;
or an RGB=Y coded grey shade image;
or a Y DR DB coded colour image.

The signsal P/G applied to the logic 47 determines the duration of a window of photographic type during the scanning of a line.

The retarded P/G signal permits a selection either of the image of graphic type whose data issue directly from the registers 27 through the palette 28, or an image of photographic type.

The signal processing circuit 35 in the construction of the circuit of FIG. 3 will now be described with reference to FIG. 5.

This circuit essentially comprises a multiplexer 60 having inputs 61 of PR, PG, PB photographic signals connected to the output of the matrixing circuit 34 (FIG. 3) and inputs 62 of GR, GG, GB graphic signals, connected to the corresponding outputs of the colour palette memory 28.

An OR gate 63 for determining the graphic mode or photographic mode has its three inputs respectively connected to the GR, GG, GB inputs of the multiplexer 60, while its output is connected to a mode control input of said multiplexer.

The processing circuit 35 finally includes a logic 64 for controlling the multiplexer having a input G adapted to receive data relating to the number of graphic planes and an input P adapted to receive data relating to the number of photographic planes.

The outputs of the multiplexer are connected to the digital-analog converters 38.

The operation of the circuit of FIG. 3 will now be described in envisaging a number of display modes.

In the case of a display in the graphic mode, the data are loaded into the plane registers 26 then transferred into the graphic shifter registers 27 whose outputs select a colour in the palette memory 28 at the rate of the dot frequency. The GR, GG and GB components applied to the processing circuit 35 are oriented directly by the latter to the digital-analog converters 38 so as to be then transmitted to the monitor 17.

In the case of a display in a photographic mode, the luminance and chrominance data are loaded into the plane registers 26 in the same way as in the graphic mode, and then transferred to the photographic shifter register 31 whose outputs select quantization values of luminance QY and chrominance QC.

These quantization values form a correspondence table relating to the differences of luminance or chrominance between neighbouring dots loaded into the photographic shifter registers 31.

The quantization values QY and QC are transmitted to the photographic unit 33 which delivers, in association with the matrixing circuit 34, in the manner indicated in the description relating to FIG. 4, colour components PR, PG and PB which, when applied to the processing circuit 35, will appear on the converters 38 for the purpose of being displayed.

In the case of the display on the same screen of photographic zones and graphic zones which are distinct, there will be seen on the screen of the monitor images processed by the photograhic unit 33 and images issuing from the colour palette memory 28.

In this case, the processing circuit 35 performs a function of selection between the graphic GR, GG, GB components, and the photographic PR, PG, PB components. The shifter registers 27 and 31 are also used alternately.

The choice between an image processed in the photographic mode or in the graphic mode is made by the attributes register 29.

In the case of a photographic display with interposition of graphic mode, according to the content of the attributes register 29 which determines the number of planes for representing the graphic mode and separately, the photographic mode, the content of the plane register 26 will be transferred suitably to the graphic and photographic shifter registers 27 and 31.

The two groups of registers will this time operate in parallel at the rate of the point frequency and will select, one one hand, graphic GR, GG, GB components issuing from the colour palette 28 and, on the other hand, quantization values which, when applied to the photographic unit 33, will permit the production of the PR, PG, PB colour components.

Figure 5:
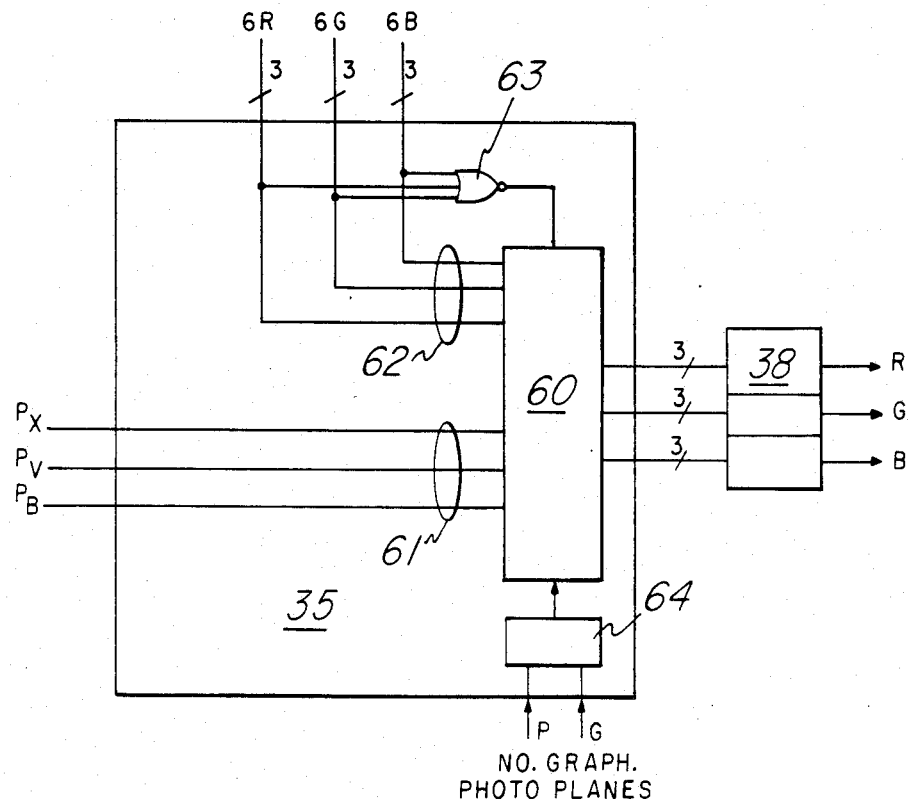
FIG. 5 is a diagram of the circuit for processing signals which is part of the construction of the device of FIG. 3.

The processing circuit 35 shown in FIG. 5 performs different functions depending on the envisaged display mode.

In the case of the graphic display or photographic display alone, the circuit 35 will select, once for all of the screen of the monitor, either the graphic channel, or the photographic channel. This selection is effected by the multiplexer 60 controlled by the data of the number of planes (number of colours=$2^n$ planes, n being the number of planes) issuing from the attributes register 29 (FIG. 3).

In the case of the display on the same screen of distinct photographic and graphic zones, the register 29 is modified in the course of the line scanning and raster scanning and alternatively, there may be had graphic zones which will select the multiplexer 60 on the GR, GG, GB channel or photographic zones which will select the multiplexer on the PR, PG, PB channel.

This alternation is achieved under the control of P and G signals applied by the attributes register 29 to the logic 64 of the processing circuit 35. These signals are at 1 when the number of planes is different from zero.

In the case of a photographic display with superimposition of a graphic mode, there is a number of both photographic planes and graphic planes different from zero. The signals P and B are at 1, which has for result that the OR gate 63 which detects the presence of colours on the graphic channel, itself puts into action the multiplexer 60.

When GR, GG, GB are at zero, the OR gate 63 produces a level 1 which selects by the multiplexer 60 the PR, PG, PB photographic channel.

When at least one of the GR, GG, GB inputs is different from zero, the multiplexer selects the graphic channel.

This for example permits superimposing text or curves on a photographic image dot by dot, the shape of the letters or of the curves appearing in the chosen colour on the photographic image.

The device for converting luminance and chrominance signals into RGB signals which has been described with reference to FIG. 4 has been considered to be applied to a graphic-photographic display device.

However, it will be understood that such a converting device of completely digital design may be used in any application where it is necessary to convert luminance and chrominance signals into R, G, B components.

This is the case for example for television receivers.

I claim:

1. A device for composition of colour component signals from luminance and chrominance signals, comprising means for computing relationships relating said luminance and chrominance signals with the colour components derived therefrom, characterized in that said computing means are logic means comprising means (40, 41, 42) for decoding said luminance and chrominance signals, and means (43, 44, 45, 46) for matrixing said decoded luminance and chrominance signals in accordance with relations established between said luminance and chrominance signals on one hand, and said colour components on the other hand.

2. A device according to claim 1, characterized in that said means (40, 41, 42,) for decoding said luminance and chrominance signals are decoders of signals generated by differential pulse code modulation (DPCM).

3. A device according to claim 1, characterized in that said means for decoding said luminance and chrominance signals comprise a differential pulse code modulation (DPCM) decoder per colour component to be obtained, each of said decoders comprising an adder (48, 49, 50) of values of quantization of luminance and chrominance obtained by selection after comparison of the value of luminance and chrominance between neightbouring points, and a register (51, 52, 53) controlled by a gate circuit (54) for tranferring the signals contained in the corresponding adder to the associated matrixing circuit (43, 44, 46, 45).

4. A device according to claim 3, characterised in that said gate circuit (54) comprises an input (PCOUL) controlling the passage from colour display to black and white display.

5. A device according to claim 1, characterized in that said matrixing means comprise as many matrixing circuits as there are colour components to be obtained, and are each constituted by at least one adder (43, 44, 46, 45) adapted to restore the corresponding colour component by effecting the relationship relating said colour component to the luminance and chrominance values obtained at the output of the corresponding decoder (40, 41, 42).

6. A device for displaying video images on a screen (17) comprising a composite memory in which are stored the image data to be displayed for each raster, said composite memory being connected to a video display processor (21) controlling said screen, to a central processing unit (10) and to an address processor (19) to permit the composition of the image by means of said memory, the extraction of data from said memory relating to the dots to be displayed being effected under the control of a time base (25) in synchronism with the scanning of the screen and of a device (24) controlling dynamic access to the memory, said display processor (21) comprising a palette memory (28) connected to said screen (17) and containing colour codes to be displayed on said screen, a first group of shift-registers (27) controlled by said time base (25) and selectively containing in the course of the display of a group of dots to be displayed, binary colour values contituting addresses for said palette memory (28), a second group of registers (26) adapted to temporarily store the colour data of a group of dots to be displayed after that whose data is in said shift-registers, characterized in that said device for displaying video images further comprises a photographic unit (33) comprising a composition device for composing colour component signals by matrixing decoded luminance and chrominance signals with colour components derived therefrom, adapted to ensure the display on the screen (11) in a photographic mode, said photographic unit (33) being connected to the palette memory (28) for determining the display mode to be achieved.

7. A device according to claim 6, characterised in that there is also connected to said photographic unit (33) a circuit (35) for processing signals according to the display mode to be achieved.

8. A device according to claim 6, characterized in that said first group of registers (27) connected to the palette memory is a group of shift-registers in the graphic mode and there are also provided a supplemental group (31) of shift-registers in the photographic mode connected to the second group of registers (26) in parallel with the first group of registers (27), and a circuit (32) for establishing values of quantization of luminance and chrominance (QY, QC) from values contained in said shift-registers in the photographic mode (31), said circuit (32) establishing value of quantization being connected to said photographic unit.

9. A device according to claim 7, characterised in that said processing circuit (35) comprises a multiplexer (60) having inputs in graphic mode (72) directly connected to said colour palette memory (28) and inputs in photographic mode (61) connected to the corresponding outputs of the device for composition of colour component signals from luminance and chrominance signals, said multiplexer being controlled by a logic circuit (64) connected to said means (29) for determining the display in graphic mode or in photographic mode.

* * * * *